June 5, 1962   J. M. MILLS   3,037,634
WATER FILTER
Filed June 16, 1958
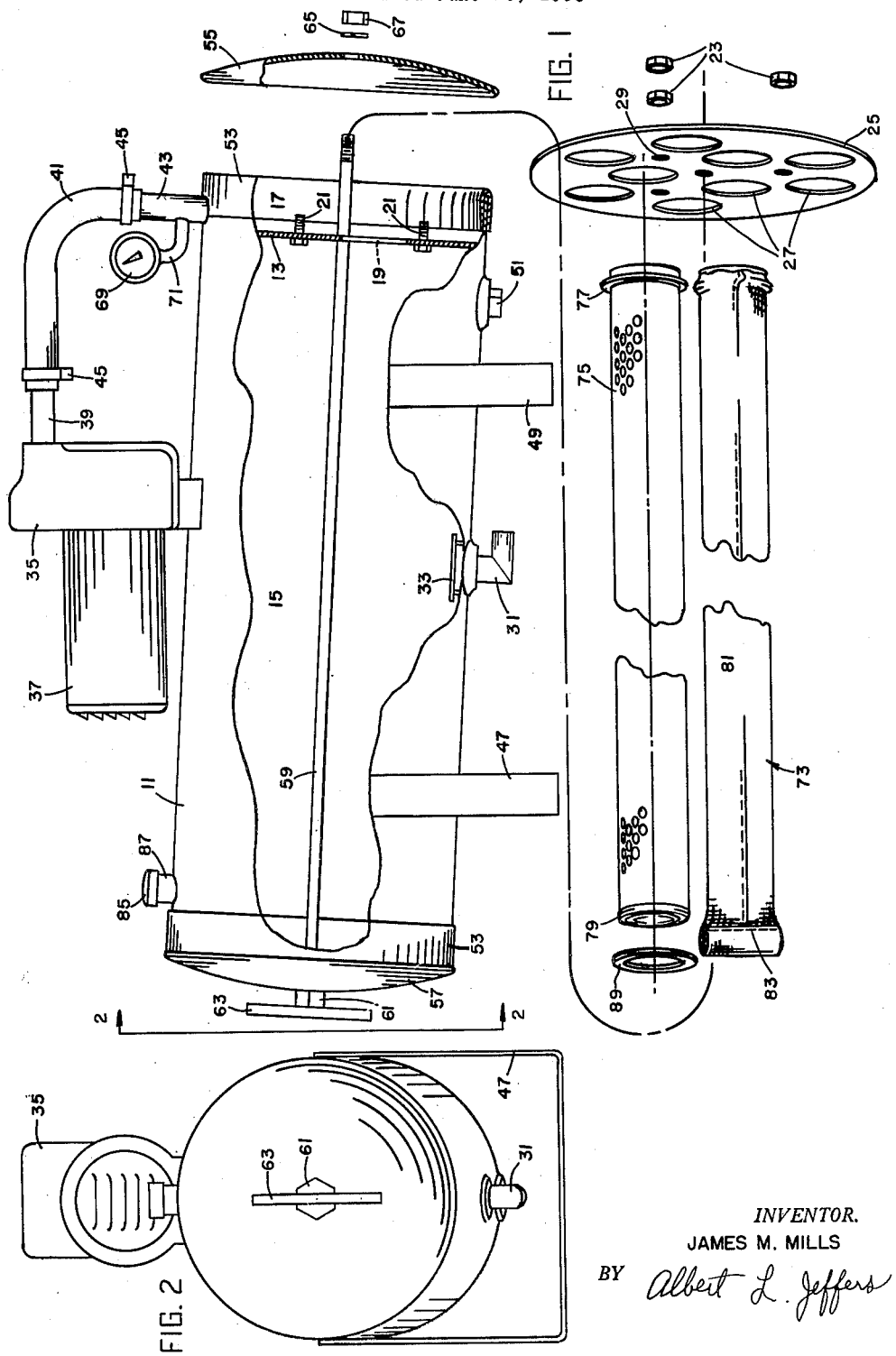
INVENTOR.
JAMES M. MILLS
BY Albert L. Jeffers 3,037,634
WATER FILTER
James M. Mills, Fort Wayne, Ind., assignor to Bowser, Inc., Fort Wayne, Ind., a corporation of Indiana
Filed June 16, 1958, Ser. No. 742,107
1 Claim. (Cl. 210—323)

This invention relates to a water filter, and more particularly to a water filter of a type wherein a coat of diatomaceous filter aid is disposed on a porous support forming a filter cartridge. It is obvious that other filter aid material, other than the diatomaceous filter aid, may be used.

The primary object of this invention is the provision of a filter cartridge wherein a large portion of the diatomaceous filter aid will not adhere to the cartridge when there is no pressure in the tank. In other words, when the operation of the filter is shut down the diatomaceous filter aid will have a tendency to fall to the bottom portion of the tank, and when the operation is again started the diatomaceous filter aid will again coat the filter cartridge.

Another object of the invention is to provide a water filter wherein the pump suction is connected to the outlet chamber, whereby a vacuum is pulled on the outlet and inlet chambers.

A further object of the invention is the provision of a filter cartridge constructed of a rigid tubular foraminated member to impart stability thereto, and having a polyethylene cloth bag disposed therearound.

A still further object of the invention is to provide a water filter which does not require a backwash operation to remove the filter aid from the cartridge.

A salient object of the invention is to provide a cartridge having a polyethylene cloth bag disposed therearound, wherein the bag has a mesh of 46 x 110 threads per square inch and constructed of monofilament threads.

In order to understand clearly the nature of the invention, and the best means for carrying it out, reference may now be had to the drawing, in which like numerals denote similar parts throughout the several views.

In the drawing:

FIGURE 1 is an elevational exploded view with parts broken away to exemplifiy structural details of a water filter constructed in accordance with this invention;

FIGURE 2 is a view taken on line 2—2 of the water filter illustrated in FIGURE 1.

Referring to the drawing, the reference numeral 11 designates a tank or casing which is provided with a stationary deck plate or partition 13, which divides the tank into an inlet chamber 15, and an outlet chamber 17. The partition is provided with a number of ports 19, and studs 21 for receiving the nuts 23.

The numeral 25 depicts a removable secondary deck plate having a number of ports 27 corresponding to the ports 19 and spaced openings 29 for receiving the studs 21.

The tank 11 is provided with a water inlet 31 which is disposed substantially in the bottom of the inlet chamber and intermediate the ends of the tank. The baffle 33 is disposed within the tank over the inlet opening to deflect the incoming water in different directions. A conventional pump 35, driven by an electric motor 37, is connected to the outlet chamber 17 through an adapter nipple 39, flexible hose 41, and the conduit 43. The flexible hose is secured by a pair of clamps 45.

The tank is disposed on a substantially horizontal plane by a pair of angular legs 47 and 49. One end of the tank is slightly higher than the other end so that the water and filter aid may be removed from the tank through a drain 51. A pair of cover gaskets 53 are disposed on each end of the tank to provide a seal between a pair of dished cover plates 55 and 57 which are secured thereto by a tie-rod 59 disposed substantially through the center of the tank. The cover plates are held on the tie-rod by a nut 61 having a handle 63, washer 65 and a nut 67 respectively.

A vacuum gauge 69 is connected to the outlet conduit by a nipple 71.

The reference numeral 73 designates a filter cartridge comprising a foraminous rigid cylindrical tube 75 having a radial flange 77 of greater diameter than the port 19, disposed adjacent one end thereof. The tube is provided with an end cap 79 disposed at the other end.

A filter bag 81 is constructed of a polyethylene cloth having monofilament threads. The mesh of the cloth is preferably 46 x 110 threads per square inch which provides a very fine porous material so that the diatomaceous filter aid will not pass therethrough. The monofilament threads of the filter bag are preferably of different diameters. The fiber diameter of the threads forming the 46 threads per inch is approximately .10 inch. The fiber diameter of the threads forming the 110 threads per inch is approximately .01 inch. One end of the bag is closed by folding the material up from the bottom and sewing it with a nylon thread 83. The same type of thread is used for sewing the bag lengthwise.

To assemble the water filter, the bag 81 is placed over the foraminous tube 75 and the cartridge 73 is inserted through the port 19 until the flange 77 is in abutment thereto. The secondary partition 25 is then placed on the tie-rod 59 and secured to the stationary deck plate by the studs 21 and nuts 23. The two deck plates rigidly support the cartridge within the inlet chamber 15. The two cover plates 57 and 55 are mounted on the tie-rod 59 and secured thereto by the nuts 61 and 67 respectively.

To place the water filter in operation the cap 85 is removed and approximately 2½ to 3½ pounds of diatomaceous filter aid is poured through the opening 87 into the inlet chamber 15. Approximately 2 or 3 gallons of water is poured in the inlet chamber 15 and the cap 85 replaced. The pump 35 is then energized whereby a vacuum is pulled on chambers 17 and 15 and the filter aid is drawn around the cartridge 73. The filter may be operated until the vacuum gauge 69 reads about 25 inches of mercury, at which time it is advisable to stop the pump 35 so that the filter aid cake will break and fall to the bottom of the tank. This is necessary because the coating of filter aid on the cartridge becomes clogged with contaminant which increases the differential pressure. After the filter aid has dropped to the bottom of the tank the pump may be again energized whereby the filter aid will again form a coat on the cartridge 73 and the filtering cycle again started. When a considerable amount of contaminant is deposited in the filter aid material, and it is desirable to add new filter aid, the drain 51 is opened and the cover 57 removed, and the cartridges washed by the simple use of a garden hose. The water filter may again be placed in operation as previously described.

In view of the foregoing description taken in conjunction with the accompanying drawing, it is believed that a clear understanding of the device will be quite apparent to those skilled in this art. A more detailed description is accordingly deemed unnecessary.

It should, of course, be understood that the description and drawing herein are illustrative merely and that various modifications and changes may be made in the structure disclosed without departing from the spirit of the invention.

I claim:

A water filter comprising, in combination, a cylindrical tube having both ends open, a stationary partition disposed within and adjacent one end of the cylindrical tube to provide an inlet chamber on one side of the stationary partition and an outlet chamber on the other side of the stationary partition, said stationary partition provided with a port, a filter cartridge comprising an elongated pervious cylindrical tube having a radial flange of a greater diameter than the port and disposed adjacent one end, a polyethylene cloth bag surrounding said pervious cylindrical tube, said polyethylene cloth bag constructed of threads having different diameters and made from monofilament synthetic fiber, a removable secondary partition having a port adapted to be aligned with the port in the stationary partition and disposed adjacent the stationary partition, said cartridge disposed in the ports with the flange disposed between the stationary partition and the removable secondary partition so that the cartridge is supported horizontally by the partitions and extending through the ports into the inlet chamber with the radial flange disposed between said partitions, a pair of spaced cover members secured to the ends of the cylindrical tube by a tie-rod means, a water inlet connected to the inlet chamber and a water outlet connected to the outlet chamber, a vacuum pump connected to the outlet chamber so that a vacuum is drawn on the outlet and inlet chambers, and a drain disposed in the inlet chamber adjacent the stationary partition.

References Cited in the file of this patent

UNITED STATES PATENTS

| | | |
|---|---|---|
| 96,515 | Voelter | Nov. 2, 1869 |
| 654,592 | Barr | July 31, 1900 |
| 666,044 | Barr | Jan. 15, 1901 |
| 1,964,419 | Asten | June 26, 1924 |
| 2,399,887 | Olson | May 7, 1946 |
| 2,562,699 | Cooperson et al. | July 31, 1951 |
| 2,612,966 | Nicol | Oct. 7, 1952 |
| 2,667,273 | Gardes | Jan. 26, 1954 |
| 2,693,882 | Olson et al. | Nov. 9, 1954 |
| 2,696,309 | Bultman | Dec. 7, 1954 |
| 2,788,125 | Webb | Apr. 9, 1957 |
| 2,810,405 | Huau | Oct. 22, 1957 |
| 2,812,065 | Wilson | Nov. 5, 1957 |

OTHER REFERENCES

Chemical Engineering, volume 61, #13, Sept. 1954.